March 8, 1949.  E. SCHUETTE  2,463,647
HOUSE MOVING TRAILER
Filed Sept. 30, 1947  4 Sheets-Sheet 1
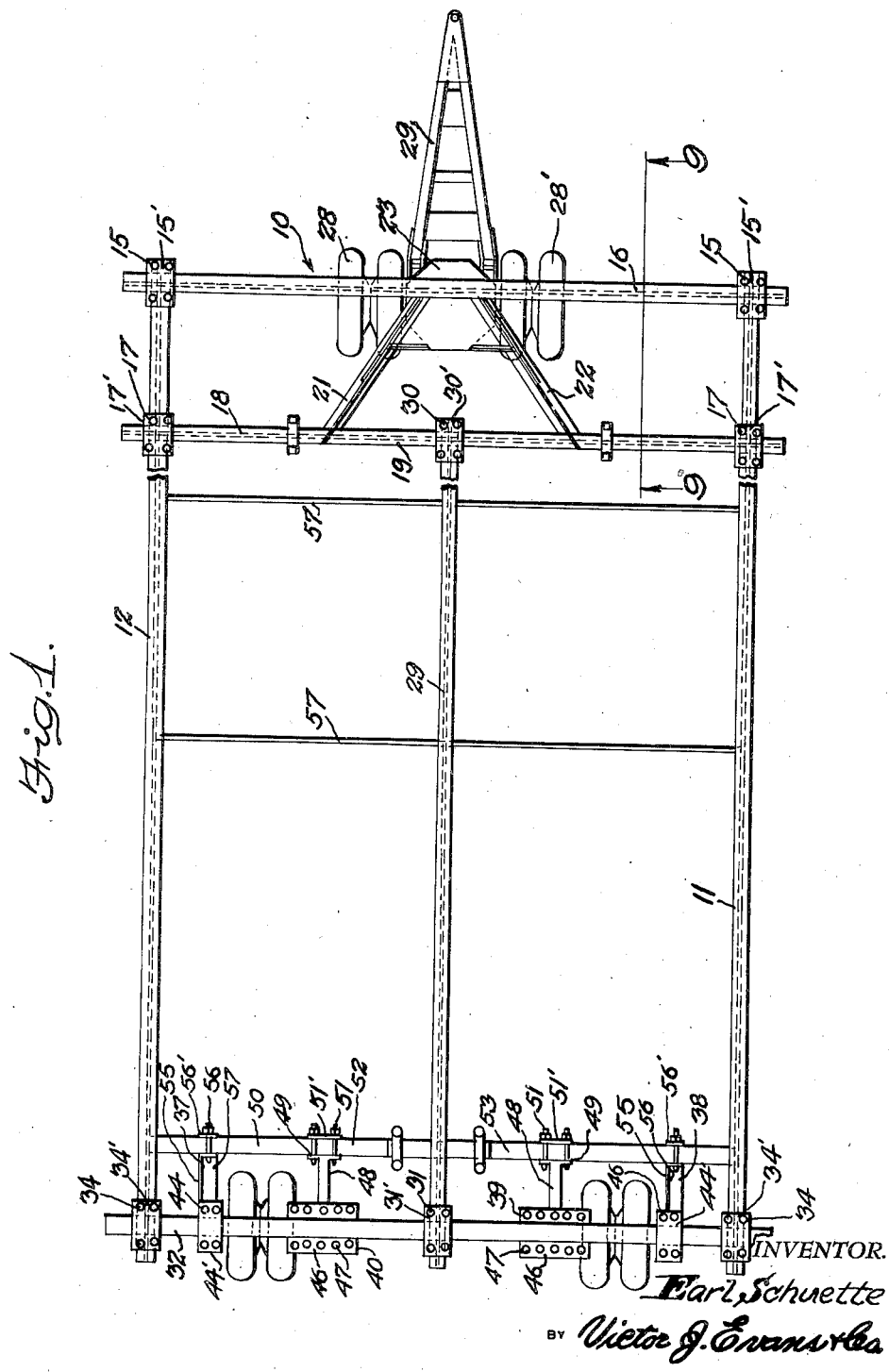
INVENTOR.
Earl Schuette
BY Victor J. Evans & Co
ATTORNEYS

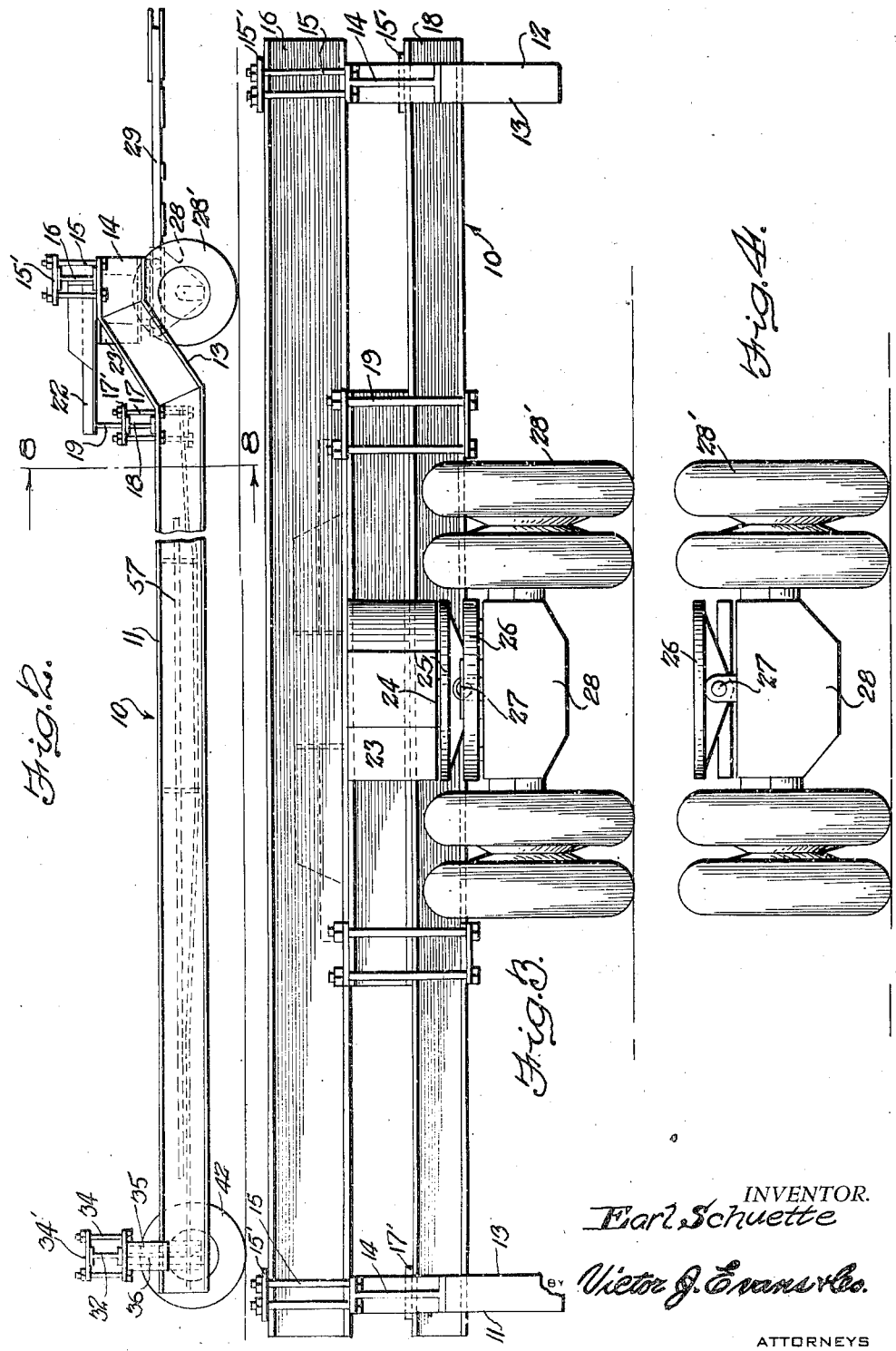

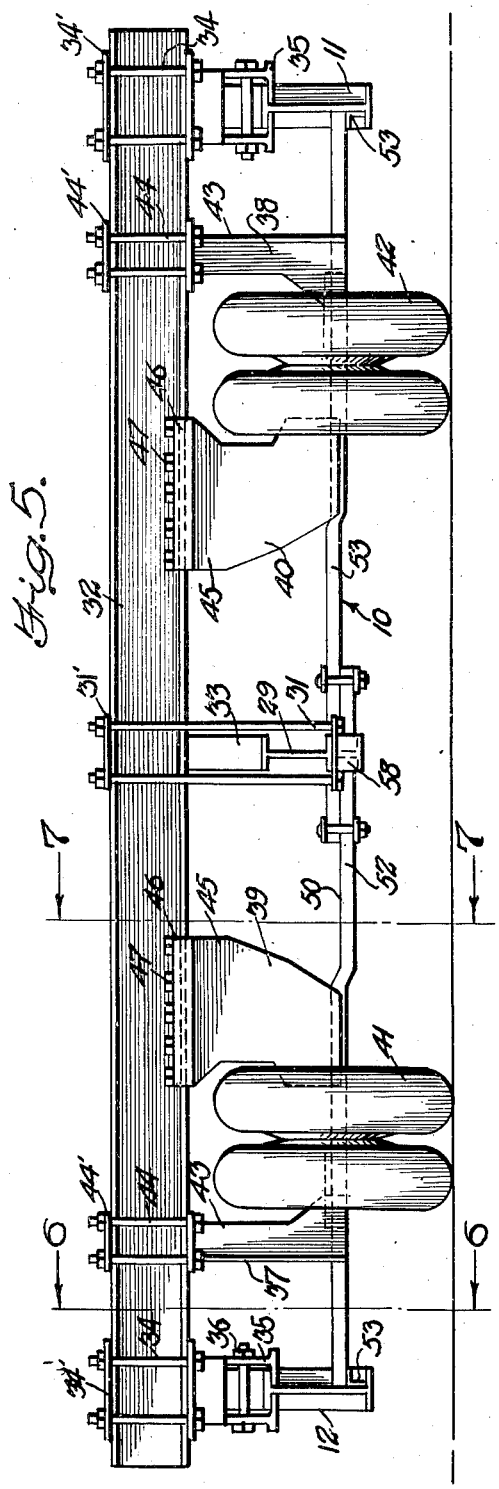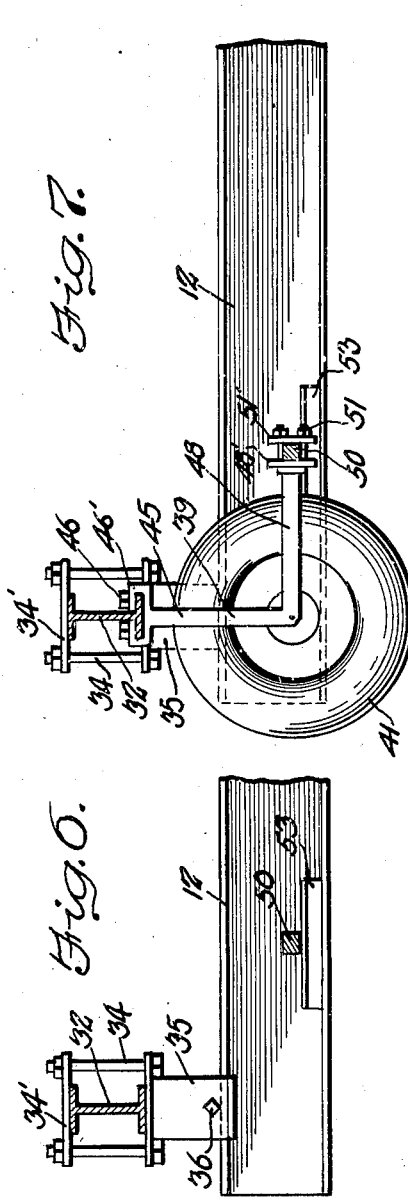

March 8, 1949.     E. SCHUETTE     2,463,647
HOUSE MOVING TRAILER
Filed Sept. 30, 1947     4 Sheets-Sheet 4
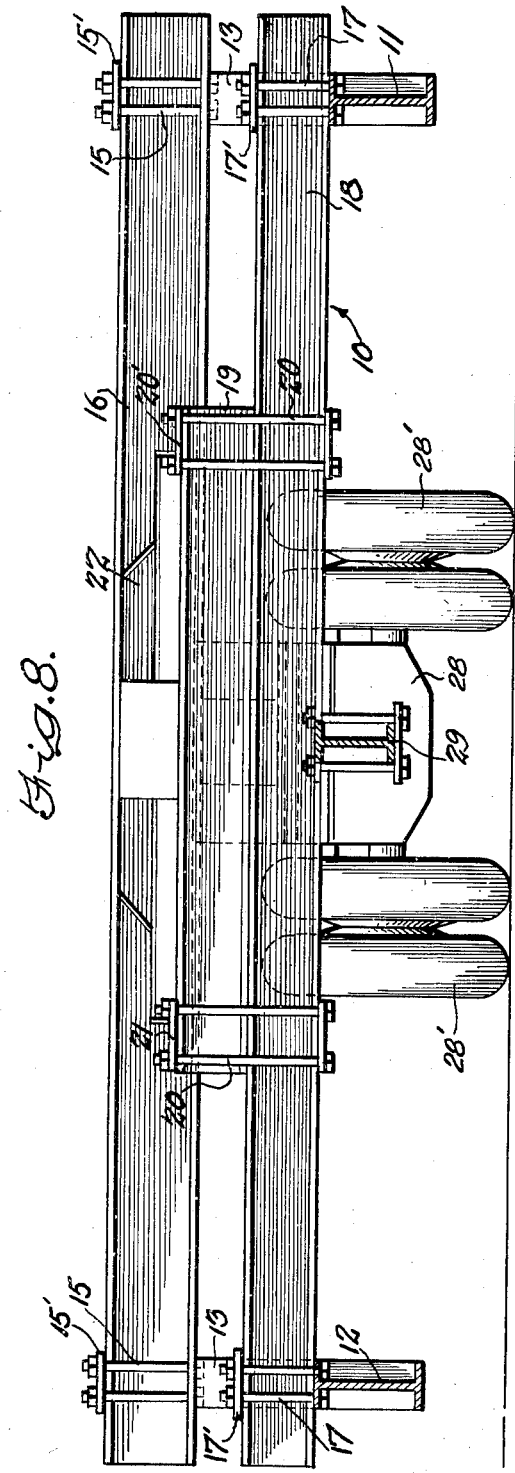
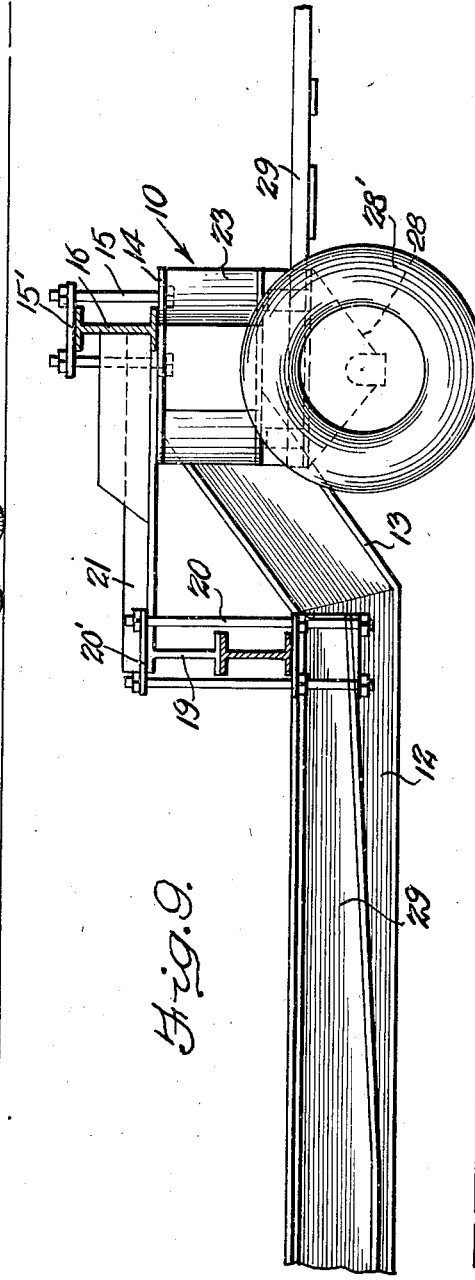
INVENTOR.
Earl Schuette
BY Victor J. Evans & Co.
ATTORNEYS Patented Mar. 8, 1949

2,463,647

UNITED STATES PATENT OFFICE 2,463,647

HOUSE MOVING TRAILER

Earl Schuette, Wausau, Wis.

Application September 30, 1947, Serial No. 777,088

2 Claims. (Cl. 280—81)

This invention relates to heavy duty trailers, and more particularly to a trailer that is specifically constructed to move houses of various shapes and sizes.

An object of the invention is to provide a knockdown trailer that is adapted to move houses, being able to be assembled in place below the house, so that when assembled, the trailer can move the house to any desired location.

The trailer constructed in accordance with the invention comprises separate individual elements that can be assembled together in fixed relation to each other, so that a house can be moved thereon, and when the foundation on which the house is to rest has been reached, can be disassembled, to permit the house to rest on the foundation.

With the above and other objects and advantages in view, the invention consists of the novel details of construction, arrangement and combination of parts more fully hereinafter described, claimed and illustrated in the accompanying drawings in which:

Figure 1 is a top plan view of the trailer embodying the invention, with the parts thereof assembled in load carrying relation to each other;

Figure 2 is a side elevational view of Figure 1;

Figure 3 is a front elevational view thereof;

Figure 4 is an elevational view of the fifth wheel and front wheel assembly;

Figure 5 is a rear view of the trailer;

Figure 6 is a sectional view on the line 6—6 of Figure 5;

Figure 7 is a sectional view on the line 7—7 of Figure 5;

Figure 8 is a sectional view on the line 8—8 of Figure 2 and

Figure 9 is an enlarged detailed fragmentary sectional view on the line 9—9 of Figure 1.

Referring more in detail to the drawings, the trailer assembled in accordance with the invention is generally designated by the reference numeral 10.

The trailer 10 comprises the I-shaped side beams 11 and 12 respectively, each of which, at their forward ends, inclines upwardly and forwardly as at 13 to terminate in a horizontal portion 14.

Secured to the portions 14, at right angles thereto by coupling bolts 15 and plates 15' is the forward cross I-shaped beam 16. By means of the coupling bolts 15, the beams 11 and 12 can be adjusted toward or away from each other to vary the distance between the beams to support houses of various sizes on the beams 11 and 12.

Secured to the beams 11 and 12, adjacent the lower rear ends of the portions 13 by coupling bolts 17 and plates 17' is a second I-shaped cross beam 18. The beams 11 and 12 are adjustable with relation to this beam in the same manner as they are to beam 16.

Secured to the central portion of the beam 18, in flange to flange engagement with the beam 18, is a short reinforcing I-shaped beam 19. The beam 19 is secured to the beam 18 by coupling bolts 20, and the plates 20' in the same manner as the other beams are assembled.

Secured to the beams 16 and 19 in fixed inwardly inclined relation to each other are the diagonal braces 21 and 22 respectively. The braces 21 and 22 are secured at their forward ends to the pedestal 23 which has secured to its lower horizontal portion 24, the upper portion 25 of the fifth wheel assembly. The lower portion 26 of the fifth wheel assembly is conventionally mounted at 27 on the pedestal 28 supported by the front wheels 28'. The pedestal 28 also carries the pivoted hitch 29 by which the trailer is towed by a power vehicle.

Secured to the center of the beam 18 in contact with the lower flange thereof, is the center beam 29. The beam 29 is secured to both the beam 18 and the beam 19 by the coupling bolts 30 and plates 30'.

At the rear end thereof the beam 29 is secured by coupling bolts 31 and plates 31' to the rear I-shaped cross beam 32. A spacing block 33 is interposed between the beam 29 and beam 32 as shown in Figure 5. Secured to each of the outer ends of the beam 32 by coupling bolts 34 and plates 34' are the block clamps 35. These clamps, by means of bolts 36, are secured to the beams 11 and 12 respectively. The beams 11 and 12 are adjustably related to the beam 32, as the former beams are to the beams 16 and 18 respectively.

Secured to the beam 32, on opposite sides of the beam 29, inwardly of the beams 11 and 12 respectively, are the outer supporting axle brackets 37 and 38 respectively, and the inner supporting axle brackets 39 and 40 respectively. These brackets support the axles for the tandem rear wheels 41 and 42 respectively.

The brackets 37 and 38 are L-shaped and the vertical portion 43 of each bracket is secured to the beam 32 by coupling bolts 44 and plates 44', as shown in Figure 5. The brackets 39 and 40 are also L-shaped, having the vertical portion 45 of each channelled at the upper end at 46 to engage the lower flange of the beam 32. Bolts 47 in the channel 46 fix the brackets to the flange of the beam 32, as shown in Figure 5.

The horizontal portions 48 of each of the brackets 39 and 40 respectively have a flanged end 49 which abuts the sectional cross beam 50, and coupling bolts 51 and plates 51' secure the flanged ends 49 of the brackets to the beam 50. The sections 52 and 53 of the beam 50 overlap at the inner ends thereof, permitting the bracket to be adjusted with relation to the beam 32. The sections of the beam 50, at their outer ends, abutting the L-shaped supporting plates 53', which are secured to the inner sides of the beams 11 and 12 respectively.

The horizontal portions 54 of the brackets 37 and 38, each have a marginal flange 55 which abuts the sections of the beam 50, and are secured to the beam by the coupling bolts 56 and plates 56'.

Adjustable tie rods 57 may be used transversely of the assembly, as well as longitudinally of the assembly, as desired, after the assembly has been adjusted to the proper size.

In use, the beams 11 and 12 are placed under a house which has been jacked up for the moving thereof. The beam 32, to which is already secured the axle supporting bracket, is wheeled into place and secured to the beams 11 and 12 respectively. The sections of the beam 50 are extended to rest on the plate 53, and a clamp 58, at the center of the beam, holds the sections in extended position. The bolts 56 and plates 56' secure the brackets 37 and 38 to the beam 50, and the bolts 51 and plates 51' secure the brackets 48 and 49 to the beam 50.

The beam 18 is secured in place, then the beam 16 carrying the diagonal braces 22 and beam 19 and fifth wheel assembly is rolled into place, and the beams 16 and 18 are secured to the beams 11 and 12 respectively, and the beam 19 is secured to the beam 18.

The center beam 29 is then placed in position and secured to the beams 18 and 32 and, if necessary, the tie-rods are then used.

When the trailer is assembled, the parts are joined together to give full support to the house.

There has thus been provided a trailer for moving houses and other large objects without causing stress or strain or dislocation of the object carried.

The trailer is built entirely of I-beams upon a one point suspension at the front of the trailer, and a two point suspension at the rear of the trailer. The frame, when being assembled, can be adjusted for either length or width, while the rear wheels can also be adjusted for width.

As described, each of the wheels, with their axles and brackets, comprises a separate unit, so that each unit can be separately adjusted. The adjustment is made for the shape and weight of the load being carried, to conform to the center of gravity.

The trailer can be dismounted and transported on a smaller trailer to the object to be moved. It is then assembled for the moving of the object. After the object has reached its destination, it is again dismounted for further transportation.

It is believed that from the foregoing description, the construction, operation and manner of use of the trailer will be apparent to those skilled in the art.

It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A knock-down trailer of the type described, comprising a pair of similarly formed side beams, forward, intermediate and rear cross beams secured to said side beams to form a body supporting frame, a fifth wheel assembly secured to the center of the forward cross beam, diagonal braces securing said fifth wheel assembly to said intermediate cross beam, independent rear wheel assemblies secured to said rear cross beam and the rear wheel assemblies each comprising L-shaped inner and outer axle supporting brackets and the vertical portion of the bracket is secured to the rear beam and the horizontal portion of the bracket is secured to a sectional axle supported at its ends by said side beams.

2. The invention as in claim 1, wherein the forward ends of the side beams having an elevated horizontal portion to which the fifth wheel assembly is secured.

EARL SCHUETTE.

REFERENCES CITED

The following references are of record in the file of this patent:

UNITED STATES PATENTS

| Number | Name | Date |
| --- | --- | --- |
| 643,721 | Maple | Feb. 20, 1900 |
| 1,049,252 | McDougall | Dec. 31, 1912 |
| 1,088,983 | Griffin | Mar. 3, 1914 |
| 1,140,470 | McDougall | May 25, 1915 |
| 2,046,206 | Ose | June 30, 1936 |
| 2,202,181 | Townsend | June 11, 1940 |